Patented Sept. 6, 1927.

1,641,241

UNITED STATES PATENT OFFICE.

ALBERT STRASSER, OF RORSCHACH, SWITZERLAND.

MANUFACTURE OF LEAD ELECTRODE FOR ACCUMULATORS.

No Drawing. Application filed August 15, 1925, Serial No. 50,488, and in Switzerland August 23, 1924.

The U. S. Letters Patent No. 1,559,471 of Oct. 27, 1925, discloses a process for the manufacture of lead electrodes for accumulators which consists in alloying metallic lead with an alkali metal capable of reducing water, then introducing this alloy into perforated insulating shells and finally dipping these shells for a sufficient time into water to fully extract the alkali metal from the alloy and to thus give to the active mass a uniform porosity throughout with recrystallization of lead.

The present invention relates to an improvement in the process above referred to, which consists in treating the electrode body, before its extracting treatment with water, in a weak caustic soda lye, for example of 6 per cent, and in subjecting the same, after the operation of extraction by water, within an electrolyte to the action of a convenient electric current, having for example a current density of 0.2 ampere per centimetre in square to eliminate any residual alkali metal from the lead mass.

The treatment of the electrode body in caustic soda lye, which may be of a duration of about one hour, is intended to avoid a too intense developement of hydrogen and consequently a too great increase of volume of the mass. The electric treatment thereof within an electrolyte, which may be constituted for example by a 2 to 3 per cent solution of perchlorate of sodium or perchlorate of potassium, has the object to perform the electrolytic dissolution of the alkali metal crystals which remained undissolved on the preceding watery extracting operation and to eliminate in this was any residual alkali metal from the lead body which then constitutes a uniform spongious mass.

The thus treated accumulator electrodes are then thoroughly washed out in distilled water and thereupon subjected to an anodic and cathodic polarization in a 3 to 4 per cent sulphuric acid solution.

The electrodes obtained according to the present improvement constitute a thoroughly spongious and pure lead body and owing to the absence of any alkali metal do not show any tendency of self-discharge.

What I claim is:

A process for the manufacture of lead electrodes for accumulators, consisting in alloying metallic lead with an alkali metal capable of reducing water, then introducing this alloy into a hollow perforated insulating body, thereupon treating the whole in a caustic soda lye and dipping it afterwards for a sufficient time into water for extracting the alkali metal from the alloy, and finally subjecting the electrode body within an electrolyte to the action of a convenient electric current.

In witness whereof I have hereunto signed my name this 4th day of August, 1925.

ALBERT STRASSER.